_United States Patent Office_

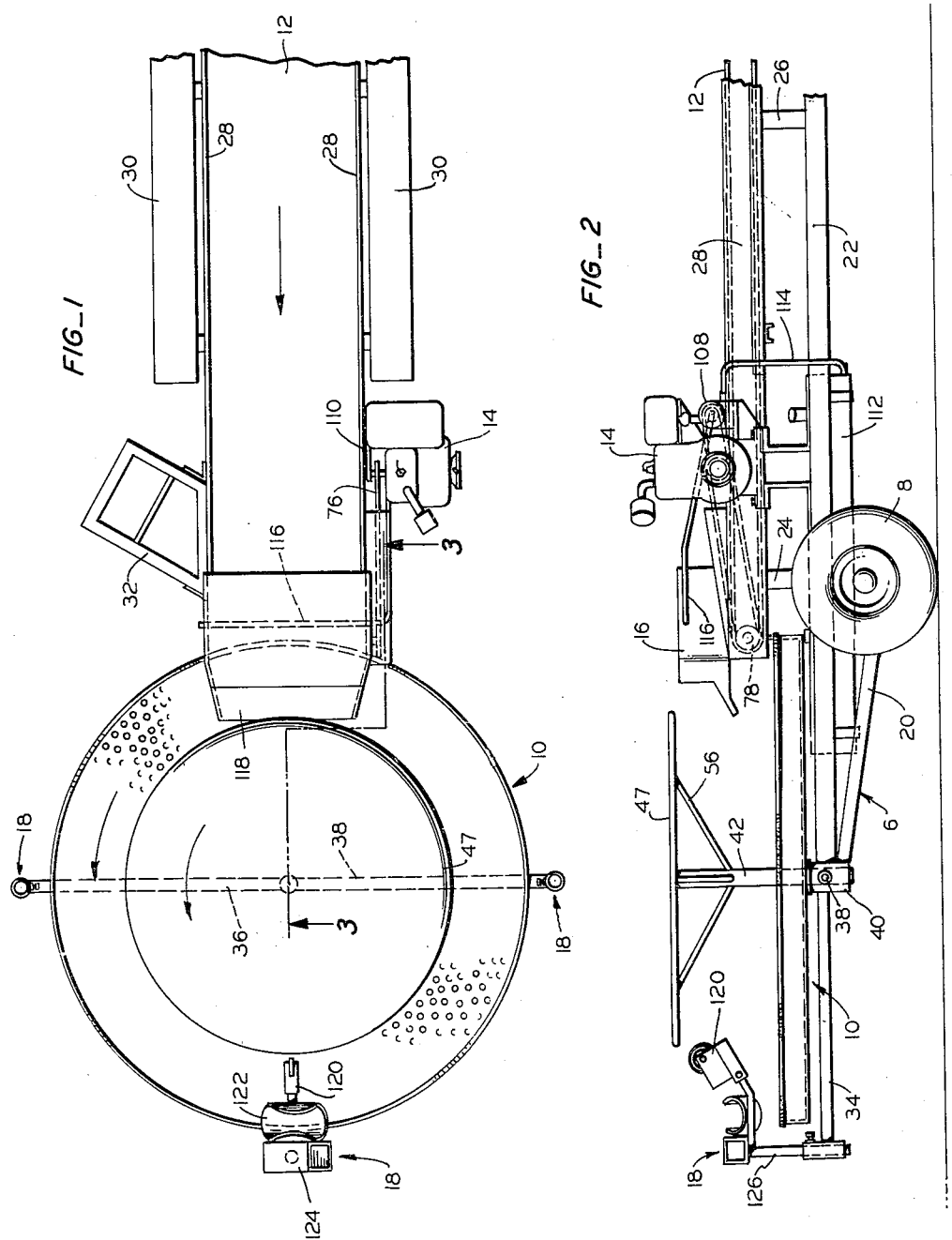

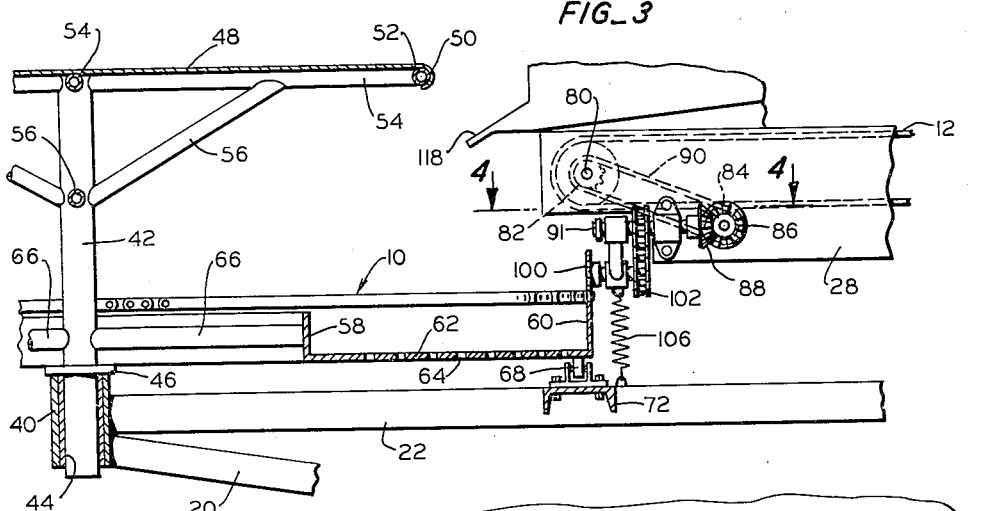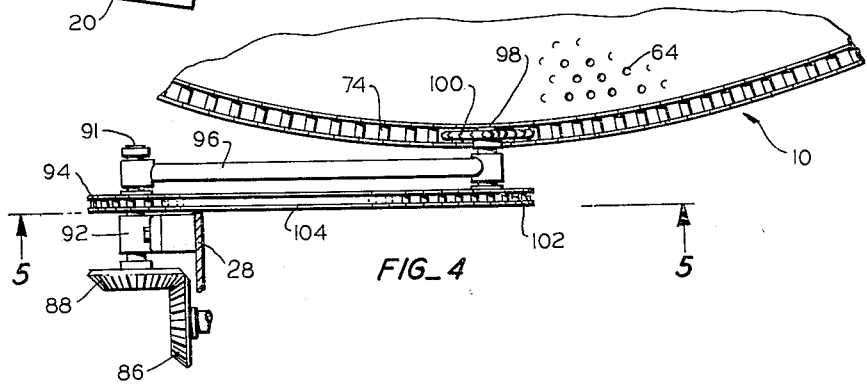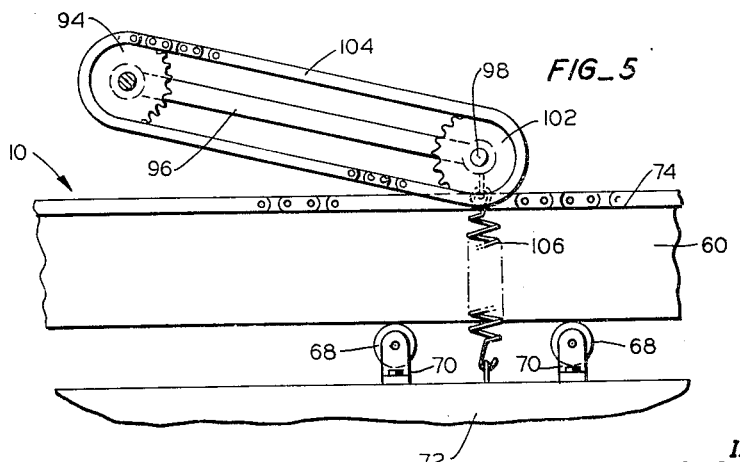

3,058,278
Patented Oct. 16, 1962

1

3,058,278
FIELD PACKING APPARATUS
Harold G. Bradshaw and Martin I. Sanderson, Salinas, Calif., assignors to Cochran Equipment Company, Salinas, Calif., a corporation of California
Filed Sept. 1, 1959, Ser. No. 837,469
11 Claims. (Cl. 53—391)

This invention relates to improvements in agricultural machinery and more particularly, to apparatus adapted for the field packing of celery and the like.

It is important that the packing of vegetables for shipment and marketing be accomplished with a minimum of handling as soon as possible after picking in order that the vegetables not be subject to undue deterioration. These requirements are best fulfilled where packing is accomplished in the field immediately after harvest, instead of in packing areas remote from the fields, as has been customary practice in the past. Field packing has the advantage of eliminating the necessity for temporary boxing and transportation of the harvested crop to remote packing facilities and thus eliminates the duplication of handling incident thereto, with its attendant danger of injury to the vegetables, as by breaking or bruising.

It is further desirable that the vegetables after packing be ready for immediate marketing to the consumer without further processing which, in the case of the more select produce such as celery hearts, involves packing in transparent polyethylene bags or the like, in addition to the usual operations of washing, trimming, and grading incident to packing. It is an object of this invention to provide field packing apparatus adapted to facilitate the packing of such select produce.

It is a further object of this invention to provide a field packing apparatus of the character described, which is adapted for travel through fields as the produce is picked and which includes rotatable table means for distributing the freshly picked produce for bagging to stations positioned about the table means.

It is yet another object of this invention to provide an apparatus of the character described which incorporates a table adapted to be driven in rotation by the same means utilized for powering an adjacently disposed delivery conveyor.

Other objects and advantages of this invention will become apparent from the following description, when taken in conjunction with the drawings in which:

FIGURE 1 is a view in plan of the apparatus of this invention with the arrows indicating the direction of travel of the delivery conveyor and the distributing table.

FIGURE 2 is a view in side elevation of the apparatus.

FIGURE 3 is a view in section taken on the lines 3—3 of FIGURE 1 illustrating the rotatable distributing table and the means for driving same in rotation.

FIGURE 4 is an enlarged view in plan of a portion of the distributing table and its driving means.

FIGURE 5 is a fragmentary view in side elevation taken on the line 5—5 of FIGURE 4.

Referring now to the drawings, the invention is shown in FIGURES 1 and 2 as comprised of a support framework 6 carried upon wheels 8—8 for movement through the fields during harvesting. At the left of the support framework 6 is carried for rotation a distributing table 10 and at the right, a delivery conveyor 12 which extends inwardly slightly beyond the outer margin of table 10 at a location immediately thereabove. Both the table 10 and the delivery conveyor 12 are powered in rotation by a motor 14 carried upon the support framework 6. At the left end of the conveyor 12 is positioned a hood 16 beneath which vegetables carried by the delivery conveyor 12 pass for washing prior to deposit upon the table

2

10. Disposed about the perimeter of the table 10 are packing stations 18, whereat are positioned means to the used in the manual bagging of vegetables delivered thereto by the table 10.

In FIGURE 2 the support frame work 6 is shown comprising a pair of diagonally extending spaced apart reinforcing or strut members 20—20 and a pair of parallel spaced apart longitudinally extending members 22—22. Upright members 24—24 and 26—26 are fixedly secured to elongated member 22 at their lower ends and carry at their upper ends side plates 28—28 from which latter extend horizontally outward to either side of conveyor 12 trimming boards 30. Also carried at one side of the conveyor 12 forwardly of one of the cutting boards 30 is a boxing rack 32. The support framework 6 further includes horizontally disposed members 34, 36 and 38 which radiate outwardly from a vertically disposed journal member 40, the latter fixedly secured intermediate members 36 and 38, which are in turn fixedly secured to the rearward ends of the support framework members 22.

In FIGURE 3, the table 10 is shown carried for rotation upon vertically disposed shaft 42 journalled at its lower end in sleeve bearing 44, in turn disposed within a vertically extending bore of journal member 40. A flange 46 fixedly secured about shaft 42 secures the latter against downward axial movement and serves also as a thrust bearing therefor. An elevated circular platform for the carrying of bagged produce is disposed centrally of table 10 being carried at the upper end of shaft 42 and comprising a circular plate 48 having an arcuate annular downturned flange 50 at its outer margin which is disposed in partially embracing relationship with a horizontally disposed supporting tubular ring member 52. In addition to the ring member 52, the framework for platform 47 includes spaced apart radially extending horizontal members 54 secured at their inner ends to shaft 42 and at their outer ends to ring member 52 and abuttingly supporting the underside of plate 48. Completing the framework are the members 56 which radiate diagonally outward and upward from shaft 42 for securing at their outer ends to associated framework members 54. Disposition of the packed bag platform 47 a substantial height above table 10 assures a dry area for placement of the bagged produce clear of the wet table 10 onto which the produce is initially delivered by the conveyor 12.

The distributing table 10 is of circular shape and of a channel cross section with an inner upstanding annular wall 58 spaced apart and concentrically disposed relative to shaft 42, an annular upstanding outer wall 60 extending beneath the terminal end of conveyor 12, and a flat bottom 62 extending horizontally between walls 58 and 60 and provided with a plurality of apertures 64. Securing of table 10 to the shaft 48 for rotation therewith is effected through members 66 which radiate horizontally outward from shaft 42 being secured at their outer ends to the wall 58. Perimeter support for table 10 while carried in rotation by shaft 42 is provided by a pair of rollers 68 arranged in tandem for rolling abutment with the under surface of table bottom 62 near its outer margin and journalled for rotation in blocks 70, in turn bolted atop inverted channel members 72 secured to extend transversely between support framework members 22. Fixedly secured atop the upper margin of outer wall 60 of the table 10 is a continuous chain 74 providing a convenient manner for connecting such table to its drive means.

As illustrated in FIGURE 2, the power for driving table 10 and the platform 47 in rotation is provided by motor 14 which, through endless belt 76 entrained over a pulley fixedly secured to the motor drive shaft and a sheave 78, drives shaft 80, FIGURE 2. Shaft 80, which is carried between conveyor side plates 28 to provide a rotatable support for the terminal or left end of the conveyor 12, has secured to its end to project to one side of the conveyor 12 a sprocket 82. Fixedly secured on a common shaft suitably supported for rotation below and to the rear or right of shaft 80, as viewed in FIGURE 3, is a sprocket 84 and a bevel gear 86, the latter disposed to mesh with a bevel gear 88. An endless chain 90 entrained about sprockets 82 and 84 drives bevel gear 86 and bevel gear 88 in rotation responsive to rotation of shaft 80.

As shown in FIGURE 4, bevel gear 88 is fixedly secured at one end of a shaft 91 journalled for rotation in a block 92. At the other end of shaft 91 is fixedly secured a sprocket 94 and outwardly thereof, for pivotal movement, an inclined elongated arm 96, which latter extends transversely beneath the terminal end of conveyor 12 and journals at its lower end a shaft 98 at either end of which are fixedly secured sprockets 100 and 102. Sprocket 100 is disposed to mesh with continuous chain 74 disposed atop table outer wall 60 to drive table 10 in rotation responsive to rotation of shaft 98 as effected through sprockets 94 and 102 and an endess chain 104 entrained thereabout. A tension spring 106 releasably secured at its lower end by hooking to member 72 and similarly secured at its upper end to arm 96, serves to bias the latter downwardly urging sprocket 100 into engagement with continuous chain 74. With arm 96 thus pivoting about shaft 91 and being yieldably urged by spring 106 to bring sprocket 100 into engagement with chain 74, a considerable amount of irregularity in the rotation of table 10 may be accommodated without disengaging sprocket 100 from its driving engagement with table 10. The downward travel of the table is of course limited at its outer margin by the rollers 68. The convenience of the above described drive arrangement with motor 14 being provided as the single prime mover may be appreciated by referring to FIGURE 2, wherein the motor is shown driving not only table 10 in rotation through the aforementioned linkage, but also the conveyor 12.

Motor 14 performs a further driving function, powering the pump 108, immediately to its rear, through endless belt 110 entrained about a pulley on the drive shaft of the motor. As has been previously indicated, it is necessary that the picked produce be thoroughly washed prior to bagging at one of the stations 18. Accordingly, it is convenient to wash the produce prior to its delivery from conveyor 12 onto the distributing table 10. Washing means are provided for this purpose which comprise tank 112 of considerable size which is disposed longitudinally of the support framework 6 for carriage intermediate longitudinally extending members 22. Tank 112 serves as a reservoir from which pump 108 delivers the washing liquid by means of conduits 114 and 116, the latter of which extends transversely about the conveyor 12 and beneath the upper end of the hood 16 with nozzles provided therein to direct a cleansing liquid spray downwardly upon the produce passing beneath the hood.

In operation the apparatus, carried upon wheels 8, is propelled through the fields by means (not shown) as the vegetable crop is picked. The freshly harvested produce, here assumed to be celery, is deposited upon a conveyor or other suitable means (not shown) for delivery onto conveyor 12, which latter is driven from right to left, as indicated in FIGURE 1, to carry the more select celery into the area of the trimming boards 30, whereat are positioned personnel by whom the celery is manually topped and otherwise suitably trimmed. The celery is thereupon re-deposited upon the conveyor 12 for passage beneath hood 16 where it is subjected to a thorough cleansing by the spray emanating from the nozzles of conduit 116. After passing beneath hood 16, the celery moves onto an inclined apron 118 secured to the hood 16 which apron directs the celery downwardly onto the table 10.

With the table 10 driven in counterclockwise rotation by motor 14 and the sprocket 100 linked thereto and in mesh with chain 74, the celery is carried to the various packing stations 18 located about the table perimeter where personnel positioned thereat manually bag the celery. At each of the stations 18 is provided the means necessary for the manual bagging operation, which typically consist of a tape dispenser 120, a bag former 122, and a bag storage box 124—all carried upon an angular arm 126 releasably secured at its lower end by set screw means to a radially extending member, such as 34, of the support framework. The packing means positioned at each of the stations 18 is of course subject to variation, both in its makeup and arrangement. However, the above-described packing means, arranged as indicated, have been found particularly satisfactory for bagging the celery in accordance with current practice. Although only three packing stations are illustrated in FIGURE 1, additional packing stations may be added as necessary and may in fact be desirable where a heavy flow of celery is to be anticipated from the conveyor 12.

As the celery is distributed by the table 10 to the various stations, packers positioned thereat remove individual bags from the storage boxes 124, form same over formers 122 and thereafter insert the celery in the bags. Tape from the dispensers 120 is then utilized for sealing the open end of the bag, whereafter the bagged celery is placed atop the central platform 47. The celery upon delivery to the table 10 is of course in a wet state and accordingly, the apertures 64 in the table bottom 62 serve to drain off the excess moisture. As previously indicated, the elevated central platform 47 serves to maintain the exterior of the bags of celery carried thereon in a dry condition, which is important inasmuch as the bags are generally manually removed from the platform for immediate packing into paperboard cartons supported upon the adjacent boxing rack 32. After such boxing, the celery is ready for immediate shipment and marketing at its destination.

It will be appreciated that the embodiment of this invention as herein described may be altered, changed or modified without departing from the spirit or scope of the invention as herein claimed.

What is claimed is:

1. Apparatus for the field packing of vegetables, comprising, in combination, a support framework, a pair of ground engaging wheels mounted on said framework for supporting the same and facilitating its movement over the ground, a perforated table for the receipt of and distribution of vegetables carried for rotation by the support framework and having driven means disposed near its outer margin, drive means above said table in meshing engagement with said driven means for powering said table in rotation, washing means including spray means for delivering water to the table, a plurality of packing stations disposed near the table outer margin and including means for facilitating the packing of vegetables distributed thereto by said table.

2. The combination of claim 1, wherein a platform is disposed centrally of and in elevated relationship with respect to said table for rotation therewith, said platform being adapted for the receipt of vegetables from said stations after packing.

3. The combination of claim 1, wherein said table is carried upon a shaft journalled for rotation in a journal member of said support framework from which member radiate outwardly beneath said table a plurality of arms at the outer ends of which are carried upwardly extending members for supporting said means for facilitating packing of vegetables at each of said packing stations.

4. Apparatus for the field packing of vegetables comprising, in combination, a support framework, a table for the receipt and distribution of vegetables carried for rotation by said support framework having meshing means disposed to girdle the table near its outer margin, driven means adapted for engagement with said meshing means for driving said table in rotation and including resilient biasing means for urging said driven means into said engagement, conveyor means carried by said support framework with its terminal end adjacent said table for delivering vegetables thereto and with a plurality of vegetable trimming stations along its length, washing means carried by said support framework including spray means, the latter being disposed at the terminal end of said conveyor for washing vegetables prior to delivery onto the table, a pump for delivery of cleansing fluid to said spray means from a reservoir disposed upon said support framework, and means for driving the pump means, the conveyor means and the table in synchronism.

5. The combination of claim 4, wherein said table is carried upon a shaft journalled for rotation in a journal member of said support framework from which radiate outwardly beneath said table a plurality of arms at the outer ends of which are carried upwardly extending members for carrying means for facilitating the bagging of vegetables.

6. Apparatus for the field packing of vegetables comprising, in combination, a wheel carried support framework, a table for the receipt and distribution of vegetables carried for rotation by said support framework, a platform for receipt of said vegetables after packing disposed centrally and above said table for rotation therewith, a plurality of packing stations disposed near said table outer margin and including means for facilitating bagging the vegetables distributed thereto by said table, a delivery conveyor carried by said support framework with its terminal end positioned adjacent said table for delivering vegetables thereto, means disposed at the terminal end of said conveyor for washing the vegetables prior to delivery onto said table, and means for unitarily driving said conveyor and said table in synchronous rotation.

7. The combination of claim 6, wherein said driving means is adapted for meshing engagement with annular meshing means girdling the table.

8. The combination of claim 7, wherein said annular meshing means comprises a chain fixedly secured to the upper margin of an upwardly extending annular outer wall of said table and engagement with said meshing means by said driving means is through a sprocket.

9. Apparatus for the field packing of vegetables comprising, in combination, a support framework, a table for the receipt and distribution of vegetables carried for rotation by said support framework, delivery means disposed adjacent said table for delivering vegetables thereto, washing means positioned near the terminal end of said delivery means for washing the vegetables prior to delivery to said table, and a plurality of packing stations disposed near the table outer margin to which the vegetables are distributed by said table for packing, said table having a circular shape with a perforated floor and being provided at its outer margin with an upwardly extending annular wall about the margin of which is provided means for meshing engagement with driven means for powering said table in rotation, said table being carried for rotation upon a shaft journaled for rotation in said support framework, and said table being provided with a platform for the receipt of vegetables after packing at said station with said platform disposed centrally of and in elevated relationship with respect to said table and being carried for rotation with said table.

10. Apparatus for the field packing of vegetables comprising in combination, a support framework, a table for the receipt and distribution of vegetables carried by said support framework for rotation relative thereto having disposed near its outer margin meshing means, driven means adapted for meshing engagament with said meshing means for powering said table in rotation, said driven means being pivoted to said support framework and resiliently biased for said meshing engagement with said meshing means, said meshing means including a chain encircling said table and said driven means being adapted to engage said chain through a sprocket carried upon a shaft journaled for rotation in one end of an elongated arm the other end of which is pivoted to said support framework to facilitate meshing between said sprocket and said chain.

11. The combination of claim 10, wherein said table is provided with an upwardly extending annular outer wall at the upper margin of which is fixedly secured said chain and wherein is disposed beneath and near the outer margin of said table proximate to said driving means roller means for peripheral support of said table.

References Cited in the file of this patent

UNITED STATES PATENTS

| | | |
|---|---|---|
| 1,204,428 | Granfield | Nov. 14, 1916 |
| 1,644,342 | Mabee | Oct. 4, 1927 |
| 1,656,501 | Rienks | Jan. 27, 1928 |
| 2,415,201 | Zademach et al. | Feb. 4, 1947 |
| 2,629,530 | Barnhard | Feb. 24, 1953 |
| 2,647,525 | Duda et al. | Aug. 4, 1953 |
| 2,865,508 | Nock | Dec. 23, 1958 |